United States Patent [19]
Nichols et al.

[11] Patent Number: 5,898,058
[45] Date of Patent: Apr. 27, 1999

[54] METHOD OF POST-POLYMERIZATION STABILIZATION OF HIGH ACTIVITY CATALYSTS IN CONTINUOUS POLYETHYLENE TEREPHTHALATE PRODUCTION

[75] Inventors: Carl S. Nichols, Waxhaw; Tony Clifford Moore; Walter Lee Edwards, both of Charlotte, all of N.C.

[73] Assignee: Wellman, Inc., Shrewsbury, N.J.

[21] Appl. No.: 08/650,291

[22] Filed: May 20, 1996

[51] Int. Cl.$^6$ .................................................. C08G 63/78
[52] U.S. Cl. ......................... 528/286; 528/275; 528/279; 528/280; 528/281; 528/283; 528/284; 528/285; 528/308; 528/308.6; 524/706; 524/710
[58] Field of Search ..................................... 528/275, 279, 528/280, 281, 283, 284, 285, 286, 308, 308.6; 524/706, 710

[56] References Cited

U.S. PATENT DOCUMENTS

| | | |
|---|---|---|
| 3,361,846 | 1/1968 | Gleim et al. . |
| 3,404,121 | 10/1968 | Barkey . |
| 3,497,477 | 2/1970 | Barkey et al. . |
| 3,919,383 | 11/1975 | Yankowsky . |
| 4,101,326 | 7/1978 | Barkey . |
| 4,122,063 | 10/1978 | Alexander et al. . |
| 4,385,145 | 5/1983 | Horn, Jr. . |
| 4,401,804 | 8/1983 | Wooten et al. . |
| 4,680,371 | 7/1987 | Rosenfeld et al. . |
| 4,824,895 | 4/1989 | Rosenfeld . |
| 4,829,113 | 5/1989 | Rosenfeld . |
| 5,008,230 | 4/1991 | Nichols . |
| 5,141,975 | 8/1992 | Enlow . |
| 5,153,164 | 10/1992 | Mason . |
| 5,166,311 | 11/1992 | Nichols . |
| 5,367,011 | 11/1994 | Walsh . |

FOREIGN PATENT DOCUMENTS 06170611  6/1994  Japan .

*Primary Examiner*—Samuel A. Acquah
*Attorney, Agent, or Firm*—Philip Summa

[57] ABSTRACT

A continuous process for producing polyethylene terephthalate polyester from terephthalic acid and ethylene glycol uses a stabilizer, preferably containing phosphorous, to produce a high quality polyethylene terephthalate polyester which is relatively free of the acetaldehyde and discoloration which are associated with the post-polymerization activity of a polymerization catalyst. The stabilizer is preferably added at or after the end of the polymerization reaction prior to polymer processing to deactivate the polymerization catalyst and can increase the throughput of the polyester without adversely affecting the thermal stability of the polyethylene terephthalate polyester. Alternatively, the late addition of the stabilizer can increase the thermal stability of the polyester without adversely affecting the throughput of the polyethylene terephthalate polyester.

13 Claims, No Drawings

METHOD OF POST-POLYMERIZATION STABILIZATION OF HIGH ACTIVITY CATALYSTS IN CONTINUOUS POLYETHYLENE TEREPHTHALATE PRODUCTION

FIELD OF THE INVENTION

The present invention relates to the continuous production of polyethylene terephthalate polyester. More particularly, the present invention relates to the stabilization of high activity polymerization catalysts in continuous polyethylene terephthalate production.

BACKGROUND OF THE INVENTION

Because of their strength and heat and chemical resistance, polyester fibers and films are an integral component in numerous consumer products manufactured worldwide. The overwhelming majority of the commercial polyester used for polyester fibers and films is polyethylene terephthalate (PET) polyester. Because PET forms a lightweight and shatterproof product, one popular use for PET is as a resin for beverage bottles.

Prior to 1965, the only feasible method of producing PET polyester was to react dimethyl terephthalate (DMT) with ethylene glycol in a catalyzed ester interchange reaction to form bis(2-hydroxyethyl)terephthalate monomer and methanol. The monomer is then polymerized through polycondensation to produce polyethylene terephthalate. Because purer forms of terephthalic acid (TA) have become increasingly available, TA has become an acceptable alternative to DMT as a starting material for the production of polyethylene terephthalate. In a reaction similar to that between DMT and ethylene glycol, terephthalic acid and ethylene glycol react in a generally uncatalyzed esterification reaction to yield low molecular weight oligomers and water. As with DMT, the monomer is subsequently polymerized by polycondensation to form PET polyester. The resulting PET polymer is substantially identical to the PET polymer resulting from DMT with the possible exception of some of the end groups.

The conventional method of carrying out the formation of PET polyester was in a batch process. In the conventional batch process, the product of the ester interchange or esterification reaction was formed in one vessel and then transferred to a second vessel for polymerization. Generally, the second vessel was agitated and the polymerization reaction continued until the power used by the agitator reached a level indicating that the polyester melt had achieved the desired intrinsic viscosity and therefore, the desired molecular weight. Eventually, the polymerization reaction and later the esterification and ester interchange reactions were carried out as continuous reactions. The continuous production of PET results in greater throughput and has since been adopted in most large-scale manufacturing facilities.

When the polymerization process has been completed, the resulting polymer melt is typically extruded and pelletized for convenient storage and transport before being worked up into specific polyester articles such as filament or bottles or other items. Such steps are also typically labelled as "polyester processing" but refer of course to later working of the finished polyester rather than to the chemical processing steps used to form the polyester in the first place.

In both the batch and the continuous processes, a high activity catalyst is often employed to increase the rate of polymerization thus increasing the throughput of the resulting PET polyester. The high activity catalysts which are used in the polymerization of PET polyester can be basic, neutral or acidic, and are often metal catalysts. Primarily, the traditional polymerization catalysts used in the formation of PET from both TA and DMT contain antimony and the most common of the antimony-containing catalysts is antimony trioxide, $Sb_2O_3$. Although polymerization catalysts such as antimony trioxide result in the increased production of PET, these same polymerization catalysts will eventually begin to catalyze or encourage the degradation of the polymer formed in the condensation reaction. Such degradation of the PET polymer results in the formation of acetaldehyde and the discoloration or yellowing of the PET polyester.

Additionally the availability of newer "hotter" catalysts that can significantly increase throughput has generated a corresponding need for better stabilization of the resulting polyester. U.S. Pat. No. 5,008,230 to Nichols is exemplary of such an improved catalyst.

In an attempt to reduce the degradation and discoloration of the PET polyester, stabilizing compounds are used to sequester ("cool") the catalyst thus reducing its effectiveness. The most commonly used stabilizers contain phosphorous, typically in the form of phosphates and phosphites. The phosphorous-containing stabilizers were first employed in batch processes to prevent degradation and discoloration of the PET polyester. For example, U.S. Pat. No. 4,122,063 to Alexander et al. describes the addition of triphenyl phosphates and 1,2-epoxy-3-phenoxypropane to stabilize the antimony trioxide catalyst in the post-reaction PET polyester. U.S. Pat. No. 4,385,145 to Horn, Jr. describes the addition of pentaerythritol diphosphite esters to poly(alkylene terephthalate) in a batch process to stabilize the catalyst in the post-reaction polyester thus preventing degradation and discoloration of the polyester. U.S. Pat. No. 4,401,804 to Wooten et al. describes the addition of phosphate, phosphonate and phosphite compounds to stabilize post-reaction poly(1,4-cyclohexylenedimethyl terephthalate) polyester in a batch process. U.S. Pat. No. 4,680,371 to Rosenfeld et al. describes the addition of phosphites to stabilize the basic catalysts used in the polymerization of certain aromatic polyesters. U.S. Pat. Nos. 4,824,895 and 4,829,113, also to Rosenfeld et al., describe the addition of stabilizers containing phosphorous, oxygen, sulfur, or fluorine to stabilize basic catalysts in the same aromatic polyester compounds.

Although adding a stabilizer to the polymer melt in a batch reactor is a relatively simple process, numerous problems arise if the stabilizers are added in the continuous production of PET. For instance, if the stabilizer is added after the polymerization process, i.e., during polymer processing, it may not fully blend with the polymer melt and may not prevent degradation and discoloration of the polyester. Furthermore, addition of the stabilizer during polymer processing is inconvenient and does not provide economy of scale.

One solution provided by the previously mentioned Rosenfeld patents is to add the stabilizer to the molten monomers early in the polymerization process, even before the polycondensation reaction, to prevent neutralization of the basic catalyst and discoloration of the aromatic polyesters. Nevertheless, the Rosenfeld patents are directed to the use of basic catalysts in the formation of specific aromatic polyesters and are neither directed to PET polyester nor do they specifically address the continuous formation of polyesters using Lewis acid polymerization catalysts.

Although early addition of the stabilizer prevents discoloration and degradation of the polyester, it also unfortunately results in reduced production or throughput of the polyester, i.e., reduced molecular weight of the polyester caused by a decrease in the reaction rate for the polycondensation reaction. Furthermore, the stabilizer is typically dissolved in ethylene glycol, the addition of which further slows the polymerization process. Therefore, early addition of the stabilizer in the polymerization process tends to force an undesired choice between production throughput and thermal stability of the polymer. As used herein, "thermal stability" refers to a low rate of acetaldehyde generation, low discoloration, and retention of molecular weight following subsequent heat treatment or other processing.

Therefore, in order to increase the throughput of PET polyester while limiting discoloration and degradation of the polyester, a continuous process which stabilizes the PET produced is needed in the art.

OBJECT AND SUMMARY OF THE INVENTION

It is an object of the present invention to provide a continuous process for the production of high quality polyethylene terephthalate polyester which is relatively free of the acetaldehyde and discoloration associated with the post-polymerization activity of polymerization catalysts.

It is a further object of the present invention to provide a method of deactivating a polymerization catalyst without adversely affecting the productivity (throughput) of polyethylene terephthalate.

It is a further object of the present invention to provide a method of increasing the throughput of the polymer without adversely affecting its thermal stability.

It is a further object of the present invention to provide a method of increasing the thermal stability of the polymer without adversely affecting its throughput.

It is a further object of the present invention to provide a method of stabilizing a polymerization catalyst which does not adversely affect the rate of solid state polymerization of the polyester product.

The present invention meets these objects by producing polyethylene terephthalate polyester by reacting ethylene glycol with terephthalic acid in a continuous process. The polymerization catalyst used in the polycondensation reaction forming polyethylene terephthalate is deactivated by the presence of a phosphorous-containing stabilizer that is added at or after the end of polymerization prior to polymer processing to prevent degradation and discoloration of the polyethylene terephthalate polyester without adversely affecting the productivity of the polyester.

In the preferred embodiment, a polymerization catalyst system can further increases the productivity or throughput of the polyethylene terephthalate product without adversely affecting its thermal stability. Alternatively, the polymerization catalyst system can further increase the thermal stability of the polyester product without adversely affecting its throughput.

The continuous process is generally conducted by combining the reactants at a temperature of about 240° C. to about 290° C. to yield low molecular weight oligomers and water. The oligomers are subsequently agitated at a temperature of about 260° C. to 305° C. in the presence of a polymerization catalyst to form a polyethylene terephthalate melt. A phosphorous-containing stabilizer is added at or after the end of the polymerization to the polyethylene terephthalate melt prior to polymer processing to deactivate the polymerization catalyst and is typically injected into the polymer melt to integrate the stabilizer into the polymer melt. The resulting polyester melt is extruded through a die immediately following the polymerization and eventually used as a bottle resin or as polyester fiber.

These and other objects of the present invention will become more readily apparent upon consideration of the following detailed description which describes both the preferred and alternative embodiments of the invention.

DETAILED DESCRIPTION OF THE INVENTION

The polyethylene terephthalate polyester of the invention is generally obtained from the reaction of ethylene glycol and terephthalic acid. Preferably, terephthalic acid reacts with ethylene glycol to form the polyethylene terephthalate of the invention. Nevertheless, the terephthalic acid may also contain small amounts of isophthalic acid and/or one or more functional derivatives of terephthalic acid including dimethyl terephthalate. Similarly small amounts of other glycols can be included with the ethylene glycol. Terephthalic acid and ethylene glycol react in an uncatalyzed esterification reaction to yield low molecular weight oligomers and water. The water is extracted to allow the esterification reaction to go to completion. The oligomers are then polymerized in a catalyzed polycondensation reaction to form polyethylene terephthalate and ethylene glycol. In order to allow the reaction to go to completion, ethylene glycol is extracted throughout the polycondensation reaction.

The polymerization catalysts that are preferably used in the polycondensation reaction are metals. Specific examples of appropriate polyester catalysts include germanium compounds, titanium compounds, antimony compounds, zinc compounds, cadmium compounds, manganese compounds, magnesium compounds, cobalt compounds, silicon compounds, tin compounds, lead compounds, aluminum compounds, and other similar compounds. Preferred catalysts for polyester bottle resin, for example, include germanium compounds such as germanium dioxide, antimony compounds such as antimony trioxide, cobalt compounds such as cobalt acetate, titanium compounds such as titanium tetrachloride, zinc compounds such as zinc acetate, manganese compounds such as manganese acetate and silicon compounds such as methyl silicate and other organic silicates.

The metal catalysts of the invention may be in the form of compounds such as acetates, oxides, sulfides, halides, amines, and the like. Preferably, the metal compounds are in a form which is soluble in the polymer melt. The amount of catalyst present in the invention (Tables 1–3 herein) refers to the amount of metal present in the catalyst used. Therefore, it is not necessary that the elemental metal be used as long as the amount of metal introduced into the polymer melt by the metal compounds falls within the appropriate ranges.

Other polymerization catalysts may also be used in the invention. For example, basic catalysts may be used in the formation of polyethylene terephthalate such as those described in U.S. Pat. No. 4,680,371 to Rosenfeld et al. which is incorporated entirely herein by reference. In addition, as will be apparent to one skilled in the art, any other catalysts which facilitate the conversion of bis(2-hydroxyethyl) terephthalate monomer or low molecular weight obligomers, to polyethylene terephthalate may be employed in the PET process of the invention.

Although the polymerization catalysts described above increase the rate of polymerization of the monomer, these same catalysts will begin to degrade the PET polymer thus adversely affecting the thermal stability of the polymer. As discussed herein, a thermally stable polyester refers to a polyester which has low acetaldehyde content, low discoloration and high retention of molecular weight after subsequent heat treatment or processing. Acetaldehyde formation is an objectionable result of degradation, especially in the food and beverage industry, because it can adversely affect the taste of the bottled product, even when present in very small amounts. In addition, degradation of the polymer will typically cause discoloration or yellowing of the polymer which is undesirable in most applications. Therefore, a stabilizer must be used to deactivate the polymerization catalyst which would otherwise adversely affect the thermal stability of the polymer.

Any stabilizer which will deactivate the polymerization catalyst (thus preventing the degradation and discoloration of the polyester) may be employed in the process of the invention. Generally, a thermal stabilizer which is nonreactive with the polymer and which possesses low residual moisture will be used to deactivate the polymerization catalyst in the invention. Suitable stabilizers preferably contain phosphorous, and include polyphosphoric acid; phosphoric acid; organophosphorus compounds such as organophosphates, organophosphites, and organophosphonates; orthophosphoric acid, metaphosphoric acid, pyrophosphoric acid, tripolyphosphoric acid, phosphorous acid or hypophosphorous acid, phosphoric acid; aliphatic organic carboxylic acid salts of Zn, Mn, Mg and Ca; bismuth phosphate; monoammonium phosphate, diammonium phosphate and monammonium phosphorite; salts of phosphoric acid esters having at least one free alcoholic hydroxyl group, such as sodium beta-glycerophosphate and calcium beta-glycerophosphate; phosphotungstic acid, ammonium phosphotungstate and sodium phosphotungstate; tertiary phosphines, tripropylphosphine, triphenylphosphine and ethylphenyltolylphosphine; quaternary phosphonium compounds such as triphenylmethylphosphonium iodide and triphenylbenzylphosphonium chloride; and quaternary phosphonium compounds.

One useful stabilizer is a bis(2,4-di-t-butylphenyl) pentaerythritol diphosphite such as ULTRANOX® 626 manufactured by GE Specialty Chemicals, Parkersburg, W. Va. The stabilizers can be liquid (e.g. polyphosphoric acid) or solid (e.g. ULTRANOX® 626) but are preferably added as a liquid to promote uniform blending with the polymer melt. Other useful stabilizers include polyphosphoric acid, phosphoric acid, and ethoxylated hydroxymethyl phosphonic acid (e.g. VICTASTAB™ from Akzo Chemicals, Inc., Dobbs Ferry, N.Y.). Sufficient stabilizer should be employed so that phosphorous is present in a range from about 25 to about 150 ppm based on the theoretical yield of the polymer. Because the phosphorous content of ULTRANOX® 626 is approximately 10%, ULTRANOX® 626 must be present in the range from about 250 to about 1500 ppm to provide the necessary phosphorous content. Similar calculations can be carried out in a straightforward manner for polyphosphoric acid (35% P), VICTASTAB™ (8% P), and phosphoric acid (32% P).

The continuous process for the formation of polyethylene terephthalate polyester from ethylene glycol and terephthalic acid is generally conducted in two stages. The first is the esterification stage in which the terephthalic acid and the ethylene glycol react to form low modular weight oligomers and water. In general, a continuous feed of raw materials is used employing a molar ratio of ethylene glycol to terephthalic acid of from about 1 to about 1.6. The continuous feed enters a direct esterification vessel which is operated at a temperature of from about 240° C. to about 290° C. and at a pressure of from about 5 to about 85 psia for about 1 to about 5 hours. The reaction is typically uncatalyzed and forms low molecular weight oligomers and water. The water is removed as the esterification reaction proceeds and excess ethylene glycol is provided to enable the reaction to go to completion.

The second stage of the continuous process is the polycondensation stage in which the low molecular weight obligomers are polymerized to form PET polyester. The polycondensation stage generally employs a series of 2 or more vessels and is operated at a temperature of from about 250° C. to about 305° C. for about 1 to about 4 hours. Typically, the polycondensation reaction begins in a first vessel called the low polymerizer which is operated at a pressure range of from about 0 to about 70 mm of Hg. In the low polymerizer, the monomer polycondenses to form polyethylene terephthalate and ethylene glycol. The ethylene glycol is removed from the polymer melt using an applied vacuum to enable the polycondensation reaction to go to completion. The polymer melt is typically agitated to allow the ethylene glycol to escape from the polymer melt and be removed using the vacuum. In addition, the agitator generally aids the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel. The final vessel is generally called the high polymerizer and is operated at a pressure of from about 0 to about 40 mm Hg. As with the low polymerizer, each of the polymerization vessels communicates with a flash vessel and is typically agitated to facilitate the removal of ethylene glycol thus enabling the polycondensation reaction to go to completion. The retention time in the polymerization vessels and the feed rate of the ethylene glycol and terephthalic acid into the continuous process are determined in part based on the target molecular weight of the PET polyester. Because the molecular weight can be readily determined based on the intrinsic viscosity of the polymer melt, the intrinsic viscosity of the polymer melt is generally used to determine the feed rate of the reactants and the retention time in the polymerization vessels.

In addition to the formation of polyethylene terephthalate polyester, side reactions also occur which produce undesirable by-products. For example, the esterification of ethylene glycol forms diethylene glycol (DEG) which is incorporated into the polymer chain and lowers the softening point of the polymer. In addition, cyclic oligomers, e.g., trimer and tetramers of terephthalic acid and ethylene glycol, also may occur in minor amounts. The continued removal of ethylene glycol as it forms in the polycondensation reaction will generally reduce the formation of these by-products.

The polymerization catalyst employed in the continuous process is generally added prior to, at the start of, or during the polycondensation stage as long as it is provided sufficiently early in the polycondensation stage to facilitate polycondensation of the monomer to yield polyethylene terephthalate. The preferred catalyst system previously described is generally employed and supplied in a form which is soluble in the polymer melt to enable the catalyst to be uniformly distributed throughout the polymer melt.

Once the polycondensation reaction essentially reaches completion, the polymerization catalyst begins to degrade the polymer forming acetaldehyde and causing discoloration or yellowing of the polyethylene terephthalate. A stabilizer, preferably containing phosphorous, is therefore added to the polymer melt to deactivate and stabilize the polymerization catalyst to prevent degradation and discoloration of the polyester. Preferably, the stabilizer is added to the substantially entirely polymerized polymer melt at or after the end of the polycondensation reaction but prior to polymer processing, i.e., chipping, fiber spinning, film extrusion, and the like. The preferred method of introducing the stabilizer into the polymer melt at the end of polymerization is to inject or pump the stabilizer into the polymer melt at or after the end of the polycondensation reaction. The stabilizer is preferably added in liquid form. Accordingly, liquid stabilizers can be added directly, and solid stabilizers such as ULTRANOX® 626 are typically either melted or suspended in an inert liquid carrier prior to their addition to the polymer melt.

Because the stabilizer is added late in the polymerization process, it can be added in its pure form without negatively affecting the properties of the polymer melt. In addition, uniform blending of the stabilizer and the polymer melt can be accomplished by mechanical blending such as passing the melt through pumps, conventional static mixers, and passing the melt through filtration elements to quickly deactivate the polymerization catalyst and thus prevent degradation and discoloration of the PET polyester. The stabilizer may also be added after polymerization when the polymer melt is extruded by using a screw extruder or similar means.

The late addition of the stabilizer to the polymer melt prevents the stabilizer from inhibiting ("cooling") the polymerization catalyst during the polycondensation reaction thus increasing the productivity or throughput of the continuous polyethylene terephthalate process. Furthermore, because the stabilizer is added prior to polymer processing, the stabilizer can adequately prevent discoloration and degradation of the PET polyester. Alternatively, late addition of the stabilizer can increase the thermal stability of the polyester without adversely affecting the throughput or productivity of the polyester.

Once the polymer melt exits the polycondensation stage, typically from the high polymerizer, it is generally filtered and then extruded into polyester sheets, filaments, or pellets. Preferably, the polymer melt is extruded shortly after exiting the polycondensation stage and typically is extruded immediately after exiting the polycondensation stage. Once the PET polyester is extruded it is quenched, preferably in a water trough, to quickly decrease its temperature thus solidifying it. The solidified PET polyester is formed into pellets or cut into chips for storage and handling purposes. The pellets or chips may be subjected to solid state polymerization (SSP) to increase the molecular weight of the polyester. It should be noted that the method of the invention does not adversely affect the rate of SSP and often will even increase the SSP rate. The polyester chips are then remelted and reextruded to form items such as bottles, filaments, or other applications. It should be noted that because the melting and extruding steps in the formation of the PET polyester are performed at elevated temperatures of at least greater than 260° C., it is important that the PET polyester is thermally stable and does not degrade or discolor as a result of temperature increases. Therefore, it is crucial that the stabilizer adequately blend with the polymer melt to deactivate the polymerization catalyst.

Polyethylene terephthalate polyester prepared according to the present invention is produced at a throughput that is at least about 15 percent greater, and often as much as 25 percent greater than conventional PET polyesters which use only antimony-based catalysts or other various catalysts without adversely affecting the thermal stability of the polyester. Alternatively, the PET polyester prepared according to the present invention may possess improved thermal stability without adversely affecting the throughput of the polymer. The process of the invention also can produce thermally stable "hot", i.e., high throughput, polymers with reduced metal content which would otherwise reduce the thermal stability of the product.

EXAMPLES

Polyethylene terephthalate polyester was prepared as a bottle resin according to the present invention and compared to conventional PET polyesters. Table 1 lists and compares data compiled for the PET polyester of the present invention and of the prior art. Concentrations of various components are described in ppm on a molar basis. PET resins used in the tests in Table 1 possess an intrinsic viscosity of approximately 0.62 deciliters/gram. For comparative purposes, Commercial Resins A, B, and C were prepared without the stabilizer of the present invention.

Example 1

TABLE 1

| Polymer | Phosphorus added in polymerization (ppm) | Cobalt (ppm metal) | Manganese (ppm metal) | Post polymerization phosphorus (ppm) added as Ultranox 626 | Melt Phase Polymerization Rate 1000 * IV/min | Bottle acetaldehyde (ppm) |
|---|---|---|---|---|---|---|
| 1 (control) | 30 | 20 | 0 | 0 | 2.55 | 7.5 |
| 2 | 30 | 20 | 70 | 0 | 3.15 | 6.9 |
| 3 | 30 | 20 | 70 | 25 | 3.15 | 6.0 |
| 4 | 30 | 20 | 70 | 50 | 3.18 | 4.8 |
| 5 | 30 | 20 | 70 | 100 | 3.18 | 3.9 |
| Commercial resin A | | | | | | 8.5 |
| Commercial Resin B | | | | | | 6.1 |
| Commercial Resin C | | | | | | 7.4 |

The PET packaging resins in Table 1 were prepared containing: 2–3 mole percent isophthalic acid; 2–3 mole percent diethylene glycol; and 220 parts per million antimony catalyst. The experimental resins along with commercial resins were injection molded into 2-liter carbonated beverage preforms and blow molded. Acetaldehyde concentrations were measured on the blow molded bottles.

As Table 1 demonstrates, Polymers 2–5 show enhanced polymerization rate relative to the internal control (Polymer 1). Nevertheless, Polymer 2—without the post-polymerization stabilizer—shows high and unacceptable acetaldehyde levels. The addition of late phosphorus stabilizer according to the invention (Polymers 3–5), however, shows acceptable, and at high levels of phosphorous, superior acetaldehyde levels.

Example 2 a product of Akzo. The resulting fiber resin was spun in a conventional fashion into 150 denier drawn filament yarn. The yarn's thermal stability was determined by measuring the tensile properties of the yarn after a heat treatment for 30 minutes at 225° C. Examples 19 and 20 show tensile properties equivalent to the control fiber grade polymer and a substantial thruput increase. Example 18 indicates the poor stability of fiber and yarn produced using a high reactivity catalyst system, but without the use of late phosphorus addition.

In summary, the invention provides a method of increasing polyester stability without sacrificing throughput, or of

TABLE 2

| Polymer | Late Phosphorous Addition | | | Total Phosphorus (ppm) | Cobalt added in poly. (ppm) | Melt Phase Polymerization Rate 100 * IV/min | Solid state Polymerization Rate IV/hour | Bottle acetaldehyde level (ppm) |
| --- | --- | --- | --- | --- | --- | --- | --- | --- |
| | PPA | Ultranox 626 | H3PO4 | | | | | |
| 9 | 0 | 0 | 0 | 40 | 25 | 3.11 | 0.5110 | 7.8 |
| 10 | 0 | 0 | 0 | 40 | 25 | 2.92 | 0.0118 | 6.1 |
| 11 | 33 | 0 | 0 | 40 | 25 | 3.50 | 5.0127 | 5.0 |
| 12 | 5 | 33 | 0 | 40 | 25 | 3.62 | 0.0131 | 8.3 |
| 13 | 50 | 0 | 0 | 57 | 45 | 3.83 | 0.0128 | 6.6 |
| 14 | 0 | 50 | 0 | 57 | 45 | 3.88 | 0.0151 | 7.0 |
| 15 | 0 | 0 | 33 | 40 | 25 | 3.53 | 0.0117 | 4.7 |
| 16 | 0 | 0 | 50 | 57 | 25 | 3.70 | 0.0114 | 4.3 |
| 17 | 50 | 0 | 0 | 57 | 25 | 3.69 | 0.0126 | 5.9 |

A second series of PET packaging resins were prepared containing: 2–3 mole percent isophthalic acid; 2–3 mole percent diethylene glycol; and 250 parts per million antimony catalyst. Phosphorus stabilizers added during and/or after polymerization. Melt phase polymerization was carried out to nominal 0.60 IV. The resins were solid state polymerized to nominal 0.81 IV.

The experimental resins were injection molded into 2-liter carbonated beverage preforms and blow molded. Acetaldehyde levels were measured on the blow molded bottles.

Polymers 9 and 10 represent control polymers; i.e. no late addition of phosphorous. Examples 11, 12, and 15 demonstrate the increased melt polymerization capability of the late phosphorus addition of the present invention without adversely affecting the solid state polymerization rate or the bottle acetaldehyde level. Examples 13 and 14 show that an increased reactivity catalyst system can be used with the invention to give even further increases in melt phase polymerization rate with a minimum sacrifice of SSP rates or bottle acetaldehyde levels.

increasing throughput without sacrificing stability, or of tailoring both increased throughput and increased stability as might be desired or necessary.

Although the above description generally applies to the continuous production of polyester terephthalate polyesters using terephthalic acid and ethylene glycol, it will be understood that the invention is not limited thereto and may be applied to semi-continuous processes or the production of other PET polyester and other polyesters by other methods including the reaction of DMT and ethylene glycol to form PET polyester since modifications may be made by those skilled in the art, particularly in light of the foregoing description. Therefore, these modifications and embodiments are intended to be included within the spirit and scope of the following appended claims.

That which is claimed:

1. In a continuous process for making polyethylene terephthalate polyester that includes the steps of:

reacting ethylene glycol and terephthalic acid in a heated esterification reaction to form an oligomer of terephthalic acid and ethylene glycol and water;

TABLE 3

Example 3

| System | antimony (ppm) | cobalt (ppm) | Manganese (ppm) | Phosphorus "early" (ppm) | Phosphorus "late" (ppm) | % thruput increaee | Thermal Stability |
| --- | --- | --- | --- | --- | --- | --- | --- |
| Control | 250 | 11 | 0 | 16 | 0 | 0 | Good |
| 18 | 250 | 20 | 70 | 20 | 0 | 14 | Poor |
| 19 | 250 | 40 | 0 | 0 | 35 | 20 | Good |
| 20 | 250 | 40 | 0 | 0 | 30 | 20 | Good |

Table 3 shows results of the present invention in the production of 0.645 IV fiber grade resin. The phosphorus source used for late addition in this case was Victastab HMP, removing the water as it is formed in the reacting step to enable the esterification reaction to essentially go to completion;

heating the oligomer and adding a polymerization catalyst system that includes a first component of at least one of cobalt, zinc, magnesium, manganese, and calcium, and a second component of antimony to polymerize the oligomer in a polycondensation reaction thereby forming a polymer melt containing polyethylene terephthalate polyester and ethylene glycol; and removing the ethylene glycol as it is formed in the heating step to allow the oligomer to enable the polycondensation reaction to essentially go to completion;

the improvement in the continuous process comprising:

adding a phosphorous-containing stabilizer to the substantially entirely polymerized polyester melt after the polycondensation reaction in the heating step, prior to processing the polymerized polyester, and in an amount sufficient to deactivate the polymerization catalyst to thereby permit the polymerization catalyst to increase the throughput of the polyethylene terephthalate polyester during the majority of the polymerization while preventing the polymerization catalyst from degrading and discoloring the resulting polyethylene terephthalate polyester.

2. A polyester resin made according to the process of claim 1.

3. The process for making polyethylene terephthalate polyester of claim 1 wherein the step of stabilizing the polymerization catalyst comprises injecting the phosphorous-containing stabilizer into the substantially entirely polymerized polyester melt to facilitate uniform blending of the stabilizer and the polymer melt.

4. The process for making polyethylene terephthalate polyester of claim 1 wherein the step of adding the phosphorous-containing stabilizer comprises adding a stabilizer selected from the group consisting of phosphorous, polyphosphoric acid; phosphoric acid; organophosphorus compounds, organophosphates, organophosphites, and organophosphonates; orthophosphoric acid, metaphosphoric acid, pyrophosphoric acid, tripolyphosphoric acid, phosphorous acid, hypophosphorous acid, phosphorous-containing aliphatic organic carboxylic acid salts; bismuth phosphate; monoammonium phosphate, diammonium phosphate, monammonium phosphorite; salts of phosphoric acid esters having at least one free alcoholic hydroxyl group, sodium beta-glycerophosphate, calcium beta-glycerophosphate; phosphotungstic acid, ammonium phosphotungstate, sodium phosphotungstate; tertiary phosphines, tripropylphosphine, triphenylphosphine, ethylphenyltolylphosphine; quaternary phosphonium compounds, triphenylmethylphosphonium iodide, triphenylbenzylphosphonium chloride, and quaternary phosphonium compounds.

5. A polyester resin made according to the process of claim 1.

6. The process for making polyethylene terephthalate polyester of claim 1 wherein the first component of the catalyst system is present in a range of from about 5 to about 60 ppm, the second component is present in a range of from about 10 to about 150 ppm, and antimony is present in a range from about 150 to about 650 ppm.

7. The process for making polyethylene terephthalate polyester of claim 6 wherein the step of adding the phosphorous-containing stabilizer comprises adding a stabilizer with a phosphorous content of from about 25 to about 150 ppm.

8. The process for making polyethylene terephthalate polyester of claim 7 wherein the step of adding the phosphorous-containing stabilizer comprises adding an organophosphite.

9. The process for making polyethylene terephthalate polyester of claim 8 wherein the organophosphite stabilizer is bis(2,4-di-t-butylphenyl) pentaerythritol diphosphite.

10. The process for making polyethylene terephthalate polyester of claim 8 wherein the organophosphite stabilizer is ethoxylated hydroxymethyl phosphonic acid.

11. The process for making polyethylene terephthalate polyester of claim 1 further comprising agitating the polyethylene terephthalate polyester melt during the heating step to enable ethylene glycol to be separated from the polymer melt.

12. The process for making polyethylene terephthalate polyester of claim 1 further comprising extruding the polyethylene terephthalate polyester melt through a die immediately following the heating step.

13. A polyester resin made according to the process of claim 12.

\* \* \* \* \*

UNITED STATES PATENT AND TRADEMARK OFFICE
CERTIFICATE OF CORRECTION

PATENT NO.   : 5,898,058
DATED        : April 27, 1999
INVENTOR(S)  : Nichols et al.

It is certified that error appears in the above-identified patent and that said Letters Patent is hereby corrected as shown below:

Column 12,
Lines 13, 14, delete -- the second component is present in a range of from about 10 to about 150 ppm, --

Signed and Sealed this

Fourth Day of December, 2001

Attest:

*Nicholas P. Godici*

NICHOLAS P. GODICI
*Attesting Officer*     *Acting Director of the United States Patent and Trademark Office*